US010712568B2

(12) United States Patent
Fiess et al.

(10) Patent No.: US 10,712,568 B2
(45) Date of Patent: Jul. 14, 2020

(54) PROJECTION DEVICE FOR DATA EYEGLASSES, DATA EYEGLASSES, AND METHOD FOR OPERATING A PROJECTION DEVICE FOR DATA EYEGLASSES

(71) Applicant: Robert Bosch GmbH, Stuttgart (DE)

(72) Inventors: Reinhold Fiess, Durbach (DE); Tobias Werner, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 283 days.

(21) Appl. No.: 15/744,423

(22) PCT Filed: Jun. 13, 2016

(86) PCT No.: PCT/EP2016/063444
§ 371 (c)(1),
(2) Date: Jan. 12, 2018

(87) PCT Pub. No.: WO2017/008971
PCT Pub. Date: Jan. 19, 2017

(65) Prior Publication Data
US 2018/0203234 A1 Jul. 19, 2018

(30) Foreign Application Priority Data
Jul. 16, 2015 (DE) .................. 10 2015 213 376

(51) Int. Cl.
*G02B 27/01* (2006.01)
(52) U.S. Cl.
CPC ....... *G02B 27/0172* (2013.01); *G02B 27/017* (2013.01); *G02B 2027/0134* (2013.01); *G02B 2027/0174* (2013.01); *G02B 2027/0178* (2013.01)

(58) Field of Classification Search
CPC .............. G02B 27/017; G02B 27/0172; G02B 2027/0174; G02B 2027/0178
See application file for complete search history.

(56) References Cited

U.S. PATENT DOCUMENTS

2012/0105310 A1    5/2012  Sverdrup et al.
2014/0177017 A1*   6/2014  Kubota .............. G02B 27/0103
                                                        359/13
2014/0184475 A1    7/2014  Tantos et al.
(Continued)

FOREIGN PATENT DOCUMENTS

DE    102009054231 A1    5/2011
DE    102013203616 A1    9/2014
(Continued)

OTHER PUBLICATIONS

International Search Report dated Aug. 16, 2016, of the corresponding International Application PCT/EP2016/063444 filed Jun. 13, 2016.

*Primary Examiner* — Robert E. Tallman
(74) *Attorney, Agent, or Firm* — Norton Rose Fulbright US LLP; Gerard A. Messina

(57) ABSTRACT

A projection apparatus for data eyeglasses. The projection apparatus encompasses at least one light source for emitting a light beam; and at least one holographic element, disposed or disposable on an eyeglass lens of the data eyeglasses, for projecting an image onto a retina of a user of the data eyeglasses by deflecting and/or focusing the light beam onto a eye lens of the user.

16 Claims, 4 Drawing Sheets

(56) References Cited

U.S. PATENT DOCUMENTS

2015/0036221 A1  2/2015  Stephenson
2016/0238845 A1* 8/2016  Alexander ........... G03H 1/2645

FOREIGN PATENT DOCUMENTS

DE  112013003257 T5  5/2015
EP       1515176 A1  3/2005
WO      2014115095 A2  7/2014
WO      2014155288 A2 10/2014

* cited by examiner

PROJECTION DEVICE FOR DATA EYEGLASSES, DATA EYEGLASSES, AND METHOD FOR OPERATING A PROJECTION DEVICE FOR DATA EYEGLASSES

FIELD

The present invention relates to an apparatus and a method. A further subject of the present invention is computer program.

BACKGROUND INFORMATION

A trend expected in the future is the wearing of data eyeglasses, which can introduce virtual image information into a user's field of view. While current data eyeglasses, for example, are not transparent and thus block out the outside world, more recent concepts are taking the approach of superimposing virtual image content onto the outside world. The superimposition of virtual image content onto the outside world, which moreover is still being perceived, is referred to as "augmented reality." One application, for example, is overlaying information in the context of performing work-related activities. For example, a mechanic could view a technical drawing, or the data eyeglasses could label specific regions of a machine in color. The concept is also utilized, however, in the field of computer games or other leisure activities.

SUMMARY

In accordance with the present invention, a projection apparatus for data eyeglasses, data eyeglasses, a method for operating a projection apparatus for data eyeglasses, a control unit that uses that method, and a corresponding computer program, are provided. Advantageous embodiments, and refinements and improvements thereof are described herein.

An example projection apparatus for data eyeglasses is provided in accordance with the present invention, the projection apparatus having the following features:
at least one light source for emitting a light beam; and
at least one holographic element, disposed or disposable on an eyeglass lens of the data eyeglasses, for projecting an image onto a retina of a user of the data eyeglasses by deflecting and/or focusing the light beam onto a eye lens of the user.

A "light source" can be understood as a light-emitting element such as, for example, a light-emitting diode, laser diode, or organic light-emitting diode, or an assemblage of several such light-emitting elements. The light source can in particular be embodied to radiate light of different wavelengths. The light beam can serve to generate a plurality of image spots on the retina, in which context the light beam can scan the retina, for example in rows and columns or in the form of Lissajous figures, and can be correspondingly pulsed. An "eyeglass lens" can be understood as a flat element produced from a transparent material such as glass or plastic. Depending on the embodiment, the eyeglass lens, for example, can be shaped as a correcting lens or can exhibit a tint for filtering light of specific wavelengths, for example UV light.

A "holographic element" can be understood as, for example, a holographic optical element (HOE) that can perform the function of a lens, a mirror, or a prism. Depending on the embodiment, the holographic element can be selective for specific colors and angles of incidence. In particular, the holographic element can perform optical functions that can be introduced into the holographic element using simple point-light sources. As a result, the holographic element can be manufactured very inexpensively.

The holographic element can be transparent. As a result, image information can be overlaid onto the outside world at the eyeglass lens.

In accordance with the present invention, a holographic element is disposed on an eyeglass lens of data eyeglasses, and a light beam can be deflected onto a retina of a wearer of the data eyeglasses in such a way that the wearer perceives a sharp virtual image. For example, the image can be projected directly onto the retina, via a micromirror and the holographic element, by scanning a laser beam.

A projection apparatus of this kind can be implemented comparatively inexpensively in a small installation space, and makes it possible to bring image content to a sufficient distance from the wearer. Superimposition of the image content onto the surroundings thereby becomes possible. Because the image can be written directly onto the retina by way of the holographic element, a digital light processing (DLP) chip can be omitted. A particularly large depth of focus can furthermore thereby be achieved.

According to an embodiment, the projection apparatus can have at least one reflection element for reflecting the light beam onto the holographic element. A "reflection element" can be understood, for example, as a mirror, in particular a micromirror or an array of micromirrors, or as a hologram. By way of the reflection element, a beam path of the light beam can be adapted to existing space conditions.

The reflection element can be implemented, for example, as a micromirror. The micromirror can be configured movably, for example can have a mirror surface tiltable around at least one axis. A reflection element of this kind offers the advantage of a particularly compact conformation.

It is furthermore advantageous if the reflection element is embodied to modify an angle of incidence and, additionally or alternatively, an incidence point of the light beam onto the holographic element. As a result, the holographic element can be scanned in planar fashion with the light beam, in particular, for example, in rows and columns.

According to a further embodiment, the holographic element can have at least one first projection surface region associated with a first gaze direction of the user, and one second projection surface region disposed outside the first projection surface region and associated with a second gaze direction of the user, for deflecting and/or focusing the light beam. The reflection element can be embodied to reflect the light beam onto the first projection surface region and onto the second projection surface region. A "projection surface region" can be understood as a portion of a surface of the holographic element, said surface facing toward an eye of the user when the data eyeglasses are being worn. The various projection surface regions can partly or completely overlap, or can be physically separate from one another. This embodiment has the advantage that, using only one light source, the light beam can be spread out into different regions functioning as alternative imaging paths. This has the advantage that no image information is lost in the context of pupil movements due to a change in the gaze direction of the user, since several usable imaging paths are available to the user as an "eye box." It is thus possible to omit an eye tracking unit for detecting eye movements, with the result that the manufacturing costs of the projection apparatus can be reduced.

It is also advantageous if the projection apparatus, in accordance with a further embodiment, has at least one optical element for deflecting and/or focusing a light beam, reflected from the reflection element, onto the first projection surface and/or onto the second projection surface. The optical element can likewise be, for example, a holographic element. The use of a mirror or a lens as an optical element is also conceivable, however. With this embodiment it is possible to ensure, with comparatively little outlay, that the user perceives a sharp, undistorted image when viewing both the first and the second projection surface.

The projection apparatus can furthermore have at least one collimation element for collimating a light beam emitted from the light source. A "collimation element" can be understood, for example, as a lens, functioning as a collimator, for parallelizing the light beam. The light beam can thereby be directed to the holographic element or to the reflection element in as straight a line as possible. What can be achieved, for example, by writing an image with the aid of collimated laser beams is that image sharpness is very largely independent of focusing of the lens of the eye, so that the user still perceives the image as sharp even when focusing on different planes in real space.

It is advantageous if the light source has at least one laser diode. In particular, the light source can have three laser diodes for emitting light beams at three different wavelengths, for example red, green, and blue. This has the advantage that the holographic element can be designed for only three wavelengths located comparatively far apart, so that the optical functions for the respective wavelengths can be effectively separated from one another.

The present invention furthermore provides data eyeglasses having the following features:

an eyeglass lens; and a projection apparatus in accordance with one of the embodiments described here, the holographic element being disposed on the eyeglass lens.

For example, a sharp image can be written on the retina by using the holographic element to shape and deflect an RGB laser scanned via a reflection element in the form of a micromirror. According to an embodiment, the reflection element serves not only for writing the rows and columns of the image, but also for partial or complete physical separation of different imaging paths located in the field of view of the path.

Depending on the embodiment, those imaging paths can be manipulated in part, after physical separation, by way of further holographic elements, in order to adapt the light beams to the optical function of the collectively used holographic element located on the eyeglass lens. The combination of suitable holograms makes it possible, for example, to generate, in each of the imaging paths, sharp laser dots with which a sharply resolved image can be written onto the user's retina.

For example, two or more imaging paths can be generated by way of different projection surfaces of the holographic element. The use of only three laser sources has the advantage, for example, that the holographic element can be designed only for three wavelengths located very far apart, with the result that the respective optical functions can be effectively separated from one another.

In accordance with the present invention, a method is also provided for operating a projection apparatus in accordance with one of the embodiments described above, the method encompassing the following steps:

applying control to the light source in order to emit the light beam; and furnishing a control signal for controlling a reflection element in order to direct and/or focus the light beam onto the holographic element.

It is advantageous in this context if, in the control application step, control is applied to the light source in order to emit the light beam in pulsed fashion. A plurality of different image spots can thereby be generated on the retina. It is moreover possible thereby to reduce a perceived beam diameter of the light beam.

This method can be implemented, for example, in software or hardware or in a mixed form of software and hardware, for example in a control unit.

The approach presented here furthermore provides a control unit that is embodied to carry out, control, or implement, in corresponding devices, the steps of a variant of a method presented here. This variant embodiment of the invention in the form of a control unit also allows the object on which the invention is based to be achieved quickly and efficiently.

A "control unit" can be understood in the present case as an electrical device that processes sensor signals and outputs control signals and/or data signals as a function thereof. The control unit can have an interface that can be embodied in hardware- and/or software-based fashion. With a hardware-based embodiment the interfaces can be, for example, part of a so-called "system ASIC" that contains a wide variety of functions of the control unit. It is also possible, however, for the interfaces to be dedicated integrated circuits, or to be made up at least in part of discrete components. With a software-based embodiment, the interfaces can be software modules that are present, for example, on a microcontroller alongside other software modules.

Also advantageous is a computer program product or computer program having program code that can be stored on a machine-readable medium or memory medium such as a semiconductor memory, a hard-drive memory, or an optical memory, and can be used to carry out, implement, and/or control the steps of the method in accordance with one of the embodiments described above, in particular when the program product or program is executed on a computer or an apparatus.

Exemplifying embodiments of the present invention are depicted in the figures and explained in more detail below.

DETAILED DESCRIPTION OF EXAMPLE EMBODIMENTS

Figure 1:
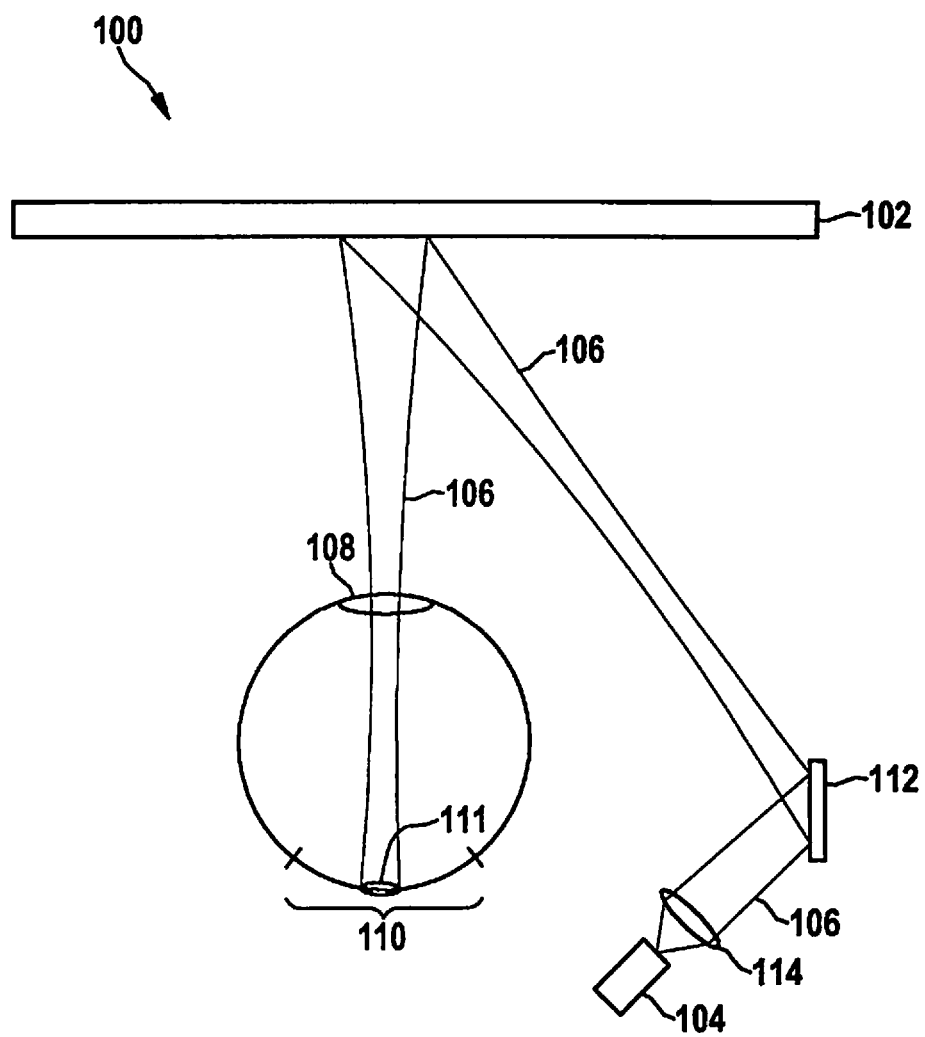
FIG. 1 schematically depicts a projection apparatus in accordance with an exemplifying embodiment.

In the description below of favorable exemplifying embodiments of the present invention, identical or similar reference characters are used for the elements that are depicted in the various Figures and function similarly, repeated description of those elements being omitted.

FIG. 1 schematically depicts a projection apparatus 100 in accordance with an exemplifying embodiment, showing the functional principle of data eyeglasses based on a holographic element 102. Projection apparatus 100 has a light source 104 for emitting a light beam 106 toward holographic element 102. Light source 104 is, for example, a laser diode. Holographic element 102 is mounted on an eyeglass lens (not shown here) of the data eyeglasses and is embodied to deflect or focus light beam 106 in such a way that, through an eye lens 108, light beam 106 strikes a retina 110 of an eye of a user of the data eyeglasses and generates thereon an image spot 111, for example a laser spot.

In accordance with this exemplifying embodiment, a micromirror constituting a reflection element 112 is disposed between light source 104 and holographic element 102 in a beam path of light beam 106. In FIG. 1, reflection element 112 reflects light beam 106 onto a surface, facing toward the user's eye, of holographic element 102 in such a way that from there, light beam 106 strikes retina 110 approximately centeredly.

Also disposed between light source 104 and reflection element 112 is an optional collimation element 114, implemented e.g. as a collimation lens, that serves to parallelize light beam 106 emitted from light source 104 so that said beam strikes reflection element 112 in a substantially straight line.

Projection apparatus 100 makes use of the retina of the human eye as a projection surface, and writes an image directly onto the retina. By way of holographic element 102, the individual light beam 106 can be shaped in such a way that its natural physical Gaussian spread, and thus its beam diameter on the retina, are reduced.

FIG. 1 shows the operation of projection apparatus 100. In accordance with an exemplifying embodiment, the light of a laser diode constituting light source 104 is collimated by way of a lens constituting collimating element 114, and guided toward a micromirror constituting reflection element 112. Reflection element 112 deflects the light toward holographic element 102. As a result of Gaussian broadening, light beam 106 will pass through a spatial constriction and then spread out again. Holographic element 102 present on the eyeglass lens acts as a deflecting and focusing element. Light beam 106 is reshaped there, and directed toward the eye. Light beam 106 is influenced very little upon passage through eye lens 108, since the beam diameter causes illumination of only a very small portion of eye lens 108. A sufficiently small beam diameter at the point at which light beam 106 is incident onto retina 110 can be achieved by suitable design of holographic element 102 and of other optical elements of projection apparatus 100.

As is explained below in further detail with reference to FIG. 2, when reflection element 112 is moved, it scans light beam 106 over holographic element 102, which in turn deflects light beam 106 toward the eye. The resulting oblique incidence of light beam 106 through eye lens 108 causes the incidence point on retina 110 to be correspondingly shifted. Reflection element 112 thus also scans similarly over retina 110. An image is then written onto retina 110 by rapidly switching light source 104 on and off at the respective points on retina 110 which are to be illuminated with image spots.

In accordance with an exemplifying embodiment, the operation described with reference to FIG. 1 can also be implemented using different laser colors simultaneously. Here holographic element 102 processes, for example, the different wavelengths of the three primary colors of an image very largely independently of one another. Because of the chromatic distance between the wavelengths, an optical function associated with a first color therefore has no interfering influence on an optical function of holographic element 102 which is associated with a second color.

Because there is little influence on eye lens 108, the eye sees the written image sharply even when focusing on different planes in real space. This is particularly advantageous for implementing augmented reality systems.

A requirement for data eyeglass systems is, for example, that eye lens 108 be capable of being moved without losing the perceived image information. When the eye rotates, it can happen that eye lens 108 moves out of the region of the laser beam and the image is thus lost.

To compensate for this, several imaging paths are offered to the eye, as shown below with reference to FIG. 3.

Figure 2:
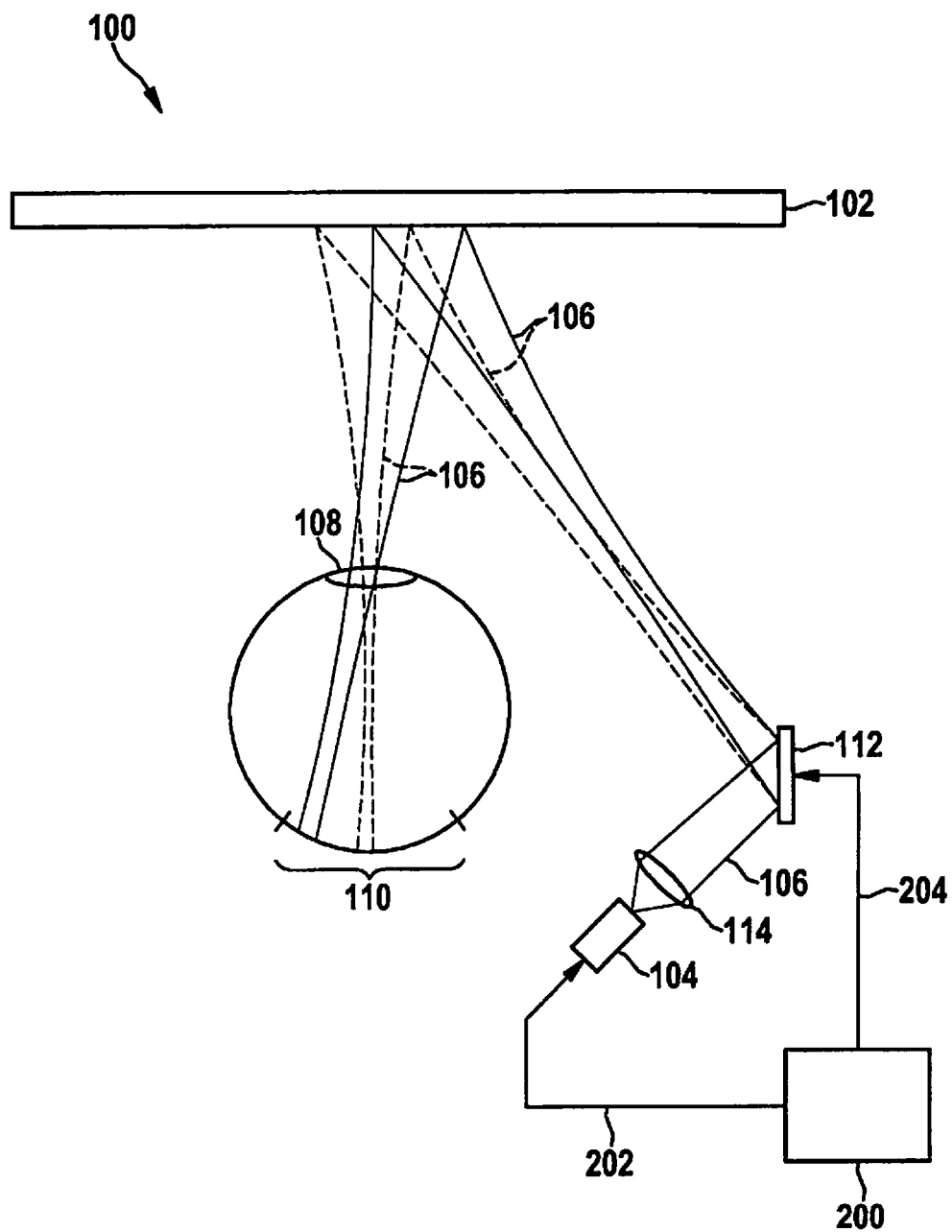
FIG. 2 schematically depicts a projection apparatus having a movable reflection element, in accordance with an exemplifying embodiment.

FIG. 2 schematically depicts a projection apparatus 100 having a movable reflection element 112, in accordance with an exemplifying embodiment. Projection apparatus 100 is, for example, a projection apparatus described with reference to FIG. 1. Unlike in FIG. 1, reflection element 112 in accordance with FIG. 2 is embodied movably. For example, reflection element 112 has a mirror surface movable around at least one axis. Depending on the tilt of the mirror surface, light beam 106 is directed at different angles of incidence onto different points on the surface of holographic element 102 so that image spot 112 projected on retina 110 correspondingly shifts.

In accordance with this exemplifying embodiment, control can be applied to light source 104 and to reflection element 112 by a control unit 200. Control unit 200 is embodied to transmit an activation signal 202 for activating light source 104 to light source 104, and a control signal 204 for controlling reflection element 112 to reflection element 112. Control unit 200 is implemented, for example, as a component of projection apparatus 100.

FIG. 2 illustrates the principle of scanning retina 110. When reflection element 112 is moved out of its initial position, holographic element 102 is then illuminated at a different location because of the modified angle of incidence and modified incidence point. Light beam 106 continues to be guided through eye lens 108, but it now strikes a different point on retina 110. A beam path of light beam 106 which is modified by displacement of reflection element 112 is characterized by dashed lines. An image to be represented on retina 110 can thereby be written pixel-by-pixel onto the retina.

Figure 3:
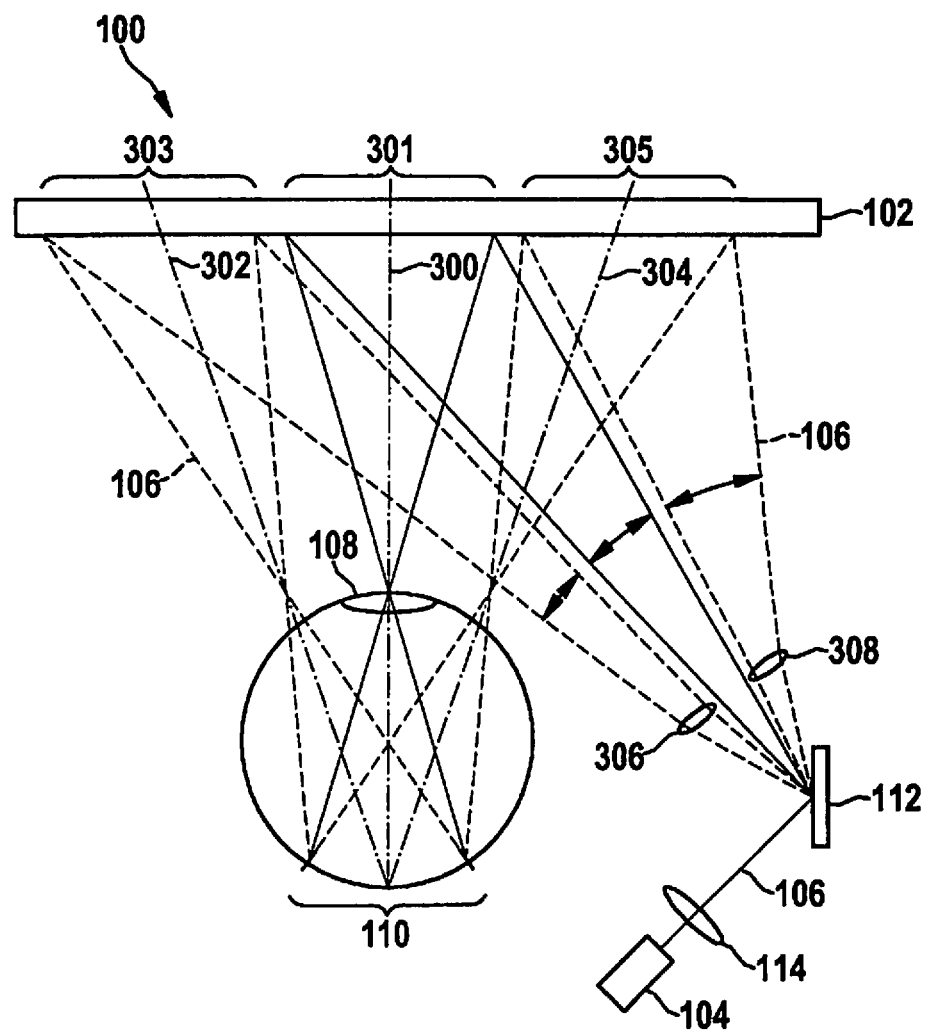
FIG. 3 schematically depicts a projection apparatus having several imaging paths, in accordance with an exemplifying embodiment.

FIG. 3 schematically depicts a projection apparatus 110 having several imaging paths, in accordance with an exemplifying embodiment. Projection apparatus 100 corresponds substantially to a projection apparatus described above with reference to FIGS. 1 and 2, with the difference that in accordance with this exemplifying embodiment, the surface of holographic element 102 is subdivided, for the projection of light beam 106 onto retina 110, into a first projection surface 301 associated with a first gaze direction 300 of the eye, a second projection surface 303 associated with a second gaze direction 302 of the eye, and a third projection surface 305 associated with a third gaze direction 304 of the eye; the three projection surfaces 301, 303, 305 can overlap or can be separate from one another. First projection surface 301, which corresponds e.g. to a beam path of light beam 106 which is shown in FIG. 1, is disposed between second projection surface 303 and third projection surface 305. Reflection element 112 is correspondingly embodied to direct or focus light beam 106, alternatingly or simultaneously, onto one of the three projection surfaces 301, 303, 305.

Several imaging paths for the pupil of the eye can be generated simultaneously using projection surfaces 301, 303, 305. If the eye moves due to a change in the user's gaze direction, eye lens 108 continues to capture light beam 106 so that the image information can continue to be imaged onto retina 110 and thus perceived by the user.

This subdivision of the surface of holographic element 102 into several projection surfaces further makes it possible to present partial images of a stereoscopic image. Scanning regions for such partial images are respectively labeled with a double arrow in FIG. 3.

Optionally, projection apparatus 100 in accordance with this exemplifying embodiment has a first optical element 306 for deflecting or focusing light beam 106, reflected by reflection element 112, onto second projection surface 303; and a second optical element 308 for deflecting or focusing light beam 106, reflected by reflection element 112, onto third projection surface 305. The two optical elements 306, 308 are implemented, for example, as holographic elements.

For better comprehension, light beam 106 emitted from light source 104 is approximated not as a single spreading Gaussian beam but as a thin, linear, parallel beam. Collimated light beam 106 that strikes reflection element 112 is deflected in different directions by the moving reflection element 112. The displacement angle of reflection element 112 is subdivided into several angular regions within which reflection element 112 is respectively displaceable in such a way that the entire image to be presented can be written therein. An image is therefore written several times and directed in different directions, and the individual images can be perspective-corrected.

Holographic element 102 is optimized, for example in the region of first projection surface 301, in such a way that when light beam 106 strikes retina 110, the resulting beam diameter is sufficiently small that a high-resolution image can be written. Thanks to the alternative imaging paths constituted by the two projection surfaces 303, 305, which are depicted here by way of example alongside the central path in the form of first projection surface 301, the aperture of eye lens 108 continues to allow light beam 106 to be projected onto retina 110 in the context of a rotation of the eye. The result is to generate a small "eye box" within which the image is perceptible by the eye. For example, the various imaging paths are offered continuously and simultaneously. It is therefore no longer necessary to ascertain the exact position of eye lens 108 in real time. A complex eye tracking unit can thus be omitted.

In accordance with this exemplifying embodiment, additional holograms, constituting optical elements 306, 308 by which light beam 106 becomes deflected and refocused, are located in the imaging path of the two outer paths, especially since holographic element 102 is optimized for the central imaging path. Optical elements 306, 308 adapt the beam shape of laser beam 106 in order to ensure a small beam diameter on retina 110, and to generate a sharp image, even when holographic element 102 is viewed from second gaze direction 302 and from third gaze direction 304. Optical elements 306, 308 furthermore deflect light beam 106 back toward holographic element 102 after the angle has been enlarged by reflection element 112. The use of holograms as optical elements allows the deflection angle necessary for that purpose to be achieved in a very small space.

All the images presented to the eye are generated, for example, using the same laser sources, for example three laser sources in the primary colors red, green, and blue. This has the advantage that holographic element 102 needs to process only those three colors. Light beam 106 strikes holographic element 102 at a different location and at a different angle via the alternatively offered imaging paths. Said element is automatically deflected in slightly different directions because of the slightly modified incoming beam conditions, with the result that the eye box for the eye lens can be generated. The beam quality is corrected by way of optical elements 306, 308 placed in the alternative imaging paths.

Thanks to the placement of holographic element 102 on the eyeglass lens, the system proves to be particularly flexible in terms of selecting the incoming beam angle at which light beam 106 strikes holographic element 102. For example, holographic element 102 is embodied to process incoming beam angles of more than 80 degrees with respect to the surface normal line. Freedom in terms of placement of the optical elements can thereby be created.

In order to further optimize the system, holograms that are written or printed pixel-by-pixel can also be used, instead of holograms imaged using simple point light sources, as holographic element 102. Somewhat more complex optical functions can be achieved in such holograms and can be used to correct the beam quality, for example in order to decrease the spot diameter and thereby achieve higher resolution.

In accordance with an exemplifying embodiment, optical elements 306, 308 are alternatively implemented as refractive optics or mirror optics. If light source 104 is correspondingly positioned it is even possible, for example, to perform a deflection toward holographic element 102, and an adaptation of the beam shape, by using small free-form mirrors.

It would also be possible to use a reflective optic instead of holographic element 102.

Figure 4:
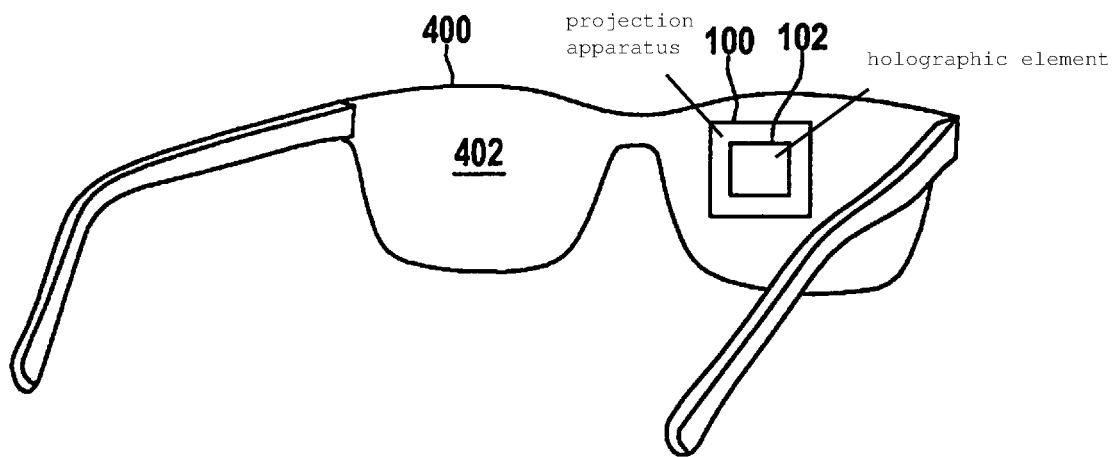
FIG. 4 schematically depicts data glasses in accordance with an exemplifying embodiment.

FIG. 4 schematically depicts data glasses 400 having a projection apparatus 100 described above with reference to FIGS. 1 to 3, in accordance with an exemplifying embodiment. The data source have an eyeglass lens 402 on which holographic element 102 is disposed. Holographic element 102 is implemented, for example, as a part of eyeglass lens 402. Alternatively, holographic element 102 is implemented as a separate element and connected to eyeglass lens 402 using a suitable joining method.

The data eyeglasses provided herein work with holographic elements in order to manipulate laser beams in such a way that an image can be written with them onto the user's retina. For this, the laser beam should have a diameter on the retina which is sufficiently small that small pixels can be written and a high resolution in the image can thus be achieved.

Figure 5:
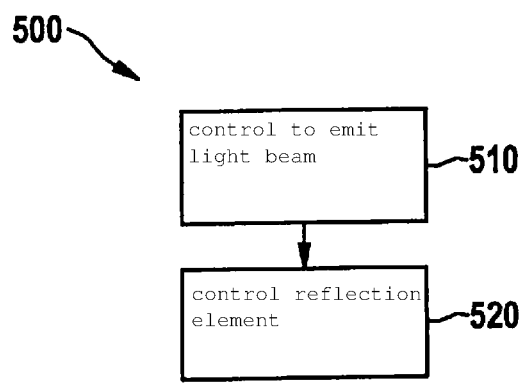
FIG. 5 is a flow chart of a method for operating a projection apparatus, in accordance with an exemplifying embodiment.

FIG. 5 is a flow chart of a method 500 for operating a projection apparatus, in accordance with an exemplifying embodiment. Method 500 can be executed, for example, in conjunction with a projection apparatus described above with reference to FIGS. 1 to 4. In a step 510, control is applied to the light source in order to emit the light beam. In a step 520, either subsequently to step 510 or simultaneously depending on the embodiment, a control signal is furnished in order to control the reflection element. Using the control signal, the reflection element can be displaced in such a way that the light beam is directed or focused onto the holographic element so that from there it strikes the user's retina through the eye lens and generates a sharp image thereon.

In accordance with an exemplifying embodiment, in step 510 control is applied to the light source in such a way that the light beam is emitted in pulsed fashion at a specific frequency. For example, in step 520 the control signal can be furnished synchronously with the pulse of the light beam.

In accordance with an exemplifying embodiment, the light of three laser diodes of the light source, collimated by way of the collimating element, is superimposed and is deflected via a moving micromirror constituting a reflection element. In order to write pixels onto a projection surface in the form of the holographic element, the reflection element moves a laser beam over the projection surface, the laser being rapidly switched on and off. After one pass, the light beam has moved once over every point on the projection surface and has supplied every pixel there with light, or not. The image is thereby written onto the projection surface. At an image frequency of 60 Hz, for example, the light beam moves over every pixel of the projection surface 60 times per second.

The light beam can be pulsed using very short pulses in order to achieve spot sizes smaller than 60 μm. Because the light beam scans over the retina, it must in any case be pulsed in order to write the individual pixels. The intensity of the light beam on the retina exhibits a Gaussian profile within the beam diameter. If very short laser pulses are used, the eye perceives not the entire width of that Gaussian profile but instead only the region of the peak of that profile. The result is that, for example, only 20 μm of a 60-μm wide beam is perceived; this reduces the effective pixel size of the image and thus increases resolution.

A spot size of 20 μm on the retina makes it possible, for example, to write an image that corresponds to the resolution of a full HD monitor and occupies 40 degrees of the field of view.

If a virtual image is generated simultaneously for both eyes using method 500 described with reference to FIG. 5, a 3-D effect can then be achieved, for example, by shifting the two partial images with respect to one another. In conventional systems for 3-D presentation, a screen such as a movie screen is used, onto which the eye is intended to focus. The eye should remain focused on the screen even when the object shifts toward or away from the viewer as a result of the 3-D effect, so that the object can be seen sharply. But because the eye, based on the real world, is accustomed to refocusing in order to achieve focus on the object plane, this can result in discomfort and loss of the 3-D effect in the context of three-dimensional viewing.

A very large depth of field can be achieved using method 500, allowing the eye to focus on a different plane and still continue to see a sharp image. Negative effects such as discomfort can thereby be reduced. A further result is to enlarge a usable region in which the objects can move so they can be perceived three-dimensionally. Method 500 is thus particularly suitable for 3-D applications, including in combination with augmented reality.

If an exemplifying embodiment encompasses an "and/or" association between a first feature and a second feature, this is to be read to mean that the exemplifying embodiment according to one embodiment exhibits both the first feature and the second feature, and according to a further embodiment exhibits either only the first feature or only the second feature.

What is claimed is:

1. A projection apparatus for data eyeglasses, comprising:
    at least one light source for emitting a light beam; and
    at least one holographic element, disposed or disposable on an eyeglass lens of the data eyeglasses, for projecting an image onto a retina of a user of the data eyeglasses by at least one of deflecting the light beam onto an eye lens of the user, and focusing the light beam onto an eye lens of the user; and
    at least one reflection element for reflecting the light beam onto the holographic element, wherein the reflection element includes a micromirror, which is disposed between the at least one light source and the at least one holographic element in a beam path of the light beam, and wherein the at least one reflection element reflects the light beam onto a surface, facing toward a user's eye, of the holographic element so that from the surface, the light beam strikes a retina of the user's eye approximately centeredly.

2. The projection apparatus as recited in claim 1, wherein the reflection element is configured to modify at least one of an angle of incidence of the light beam onto the holographic element, and an incidence point of the light beam onto the holographic element.

3. The projection apparatus as recited in claim 1, wherein the holographic element has at least one first projection surface region associated with a first gaze direction of the user, and one second projection surface region associated with a second gaze direction of the user, for at least one of deflecting and focusing the light beam, the reflection element being configured to reflect the light beam onto the first projection surface region and onto the second projection surface region.

4. The projection apparatus as recited in claim 3, further comprising:
    at least one optical element for at least one of deflecting and focusing a light beam, reflected from the reflection element, onto at least one of the first projection surface region and the second projection surface region.

5. The projection apparatus as recited in claim 1, further comprising:
    at least one collimation element for collimating the light beam emitted from the light source.

6. The projection apparatus as recited in claim 1, wherein the light source has at least one laser diode.

7. A data eyeglass apparatus, comprising:
    at least one eyeglass lens; and
    a projection apparatus including at least one light source for emitting a light beam, and at least one holographic element disposed on the at least one eyeglass lens, for projecting an image onto a retina of a user of the data eyeglasses by at least one of deflecting the light beam onto an eye lens of the user, and focusing the light beam onto an eye lens of the user; and
    at least one reflection element for reflecting the light beam onto the holographic element, wherein the reflection element includes a micromirror, which is disposed between the at least one light source and the at least one holographic element in a beam path of the light beam, and wherein the at least one reflection element reflects the light beam onto a surface, facing toward a user's eye, of the holographic element so that from the surface, the light beam strikes a retina of the user's eye approximately centeredly.

8. A method for operating a projection apparatus for data eyeglasses, the method comprising:
    controlling at least one light source in order to emit a light beam, the projection apparatus including at least one light source for emitting a light beam, and at least one holographic element disposed on the eyeglass lens, for projecting an image onto a retina of a user of the data eyeglasses by at least one of deflecting the light beam onto an eye lens of the user, and focusing the light beam onto an eye lens of the user; and providing a control signal for controlling a reflection element to at least one of direct and focus the light beam onto the holographic element;

wherein the projection apparatus includes at least one reflection element for reflecting the light beam onto the holographic element, wherein the reflection element includes a micromirror, which is disposed between the at least one light source and the at least one holographic element in a beam path of the light beam, and wherein the at least one reflection element reflects the light beam onto a surface, facing toward a user's eye, of the holographic element so that from the surface, the light beam strikes a retina of the user's eye approximately centeredly.

9. The method as recited in claim 8, wherein in the controlling, the light source is controlled to emit the light beam in a pulsed manner.

10. A control apparatus for operating a projection apparatus for data eyeglasses, comprising:

a control unit configured to perform the following:

controlling at least one light source to emit a light beam, the projection apparatus including the at least one light source for emitting the light beam, and at least one holographic element disposed on the eyeglass lens, for projecting an image onto a retina of a user of the data eyeglasses by at least one of deflecting the light beam onto an eye lens of the user, and focusing the light beam onto an eye lens of the user; and providing a control signal for controlling a reflection element to at least one of direct and focus the light beam onto the holographic element;

wherein the projection apparatus includes at least one reflection element for reflecting the light beam onto the holographic element, wherein the reflection element includes a micromirror, which is disposed between the at least one light source and the at least one holographic element in a beam path of the light beam, and wherein the at least one reflection element reflects the light beam onto a surface, facing toward a user's eye, of the holographic element so that from the surface, the light beam strikes a retina of the user's eye approximately centeredly.

11. A non-transitory machine-readable storage medium on which is stored a computer program, which is executable by a processor, comprising:

a program code arrangement having program code for operating a projection apparatus for data eyeglasses, by performing the following:

controlling at least one light source to emit a light beam, the projection apparatus including the at least one light source for emitting the light beam, and at least one holographic element disposed on the eyeglass lens, for projecting an image onto a retina of a user of the data eyeglasses by at least one of deflecting the light beam onto an eye lens of the user, and focusing the light beam onto an eye lens of the user; and providing a control signal for controlling a reflection element to at least one of direct and focus the light beam onto the holographic element;

wherein the projection apparatus includes at least one reflection element for reflecting the light beam onto the holographic element, wherein the reflection element includes a micromirror, which is disposed between the at least one light source and the at least one holographic element in a beam path of the light beam, and wherein the at least one reflection element reflects the light beam onto a surface, facing toward a user's eye, of the holographic element so that from the surface, the light beam strikes a retina of the user's eye approximately centeredly.

12. The machine-readable storage medium as recited in claim 11, wherein the projection apparatus includes a collimation element, disposed between the light source and the reflection element, the collimation element including a collimation lens to parallelize the light beam emitted from the light source so that the beam strikes the reflection element in a substantially straight line.

13. The projection apparatus as recited in claim 1, further comprising:

a collimation element, disposed between the light source and the reflection element, the collimation element including a collimation lens to parallelize the light beam emitted from the light source so that the beam strikes the reflection element in a substantially straight line.

14. The data eyeglass apparatus as recited in claim 7, further comprising:

a collimation element, disposed between the light source and the reflection element, the collimation element including a collimation lens to parallelize the light beam emitted from the light source so that the beam strikes the reflection element in a substantially straight line.

15. The method as recited in claim 8, wherein the projection apparatus includes a collimation element, disposed between the light source and the reflection element, the collimation element including a collimation lens to parallelize the light beam emitted from the light source so that the beam strikes the reflection element in a substantially straight line.

16. The control apparatus as recited in claim 10, wherein the projection apparatus includes a collimation element, disposed between the light source and the reflection element, the collimation element including a collimation lens to parallelize the light beam emitted from the light source so that the beam strikes the reflection element in a substantially straight line.

* * * * *